(12) United States Patent
Zeng et al.

US011350301B2

(10) Patent No.: US 11,350,301 B2
(45) Date of Patent: May 31, 2022

(54) GRID REFERENCE SYSTEM WIRELESS NETWORK ANOMALY DETECTION AND VISUALIZATION

(71) Applicant: AT&T Intellectual Property I, L.P., Atlanta, GA (US)

(72) Inventors: Helen Zeng, Mountain View, CA (US); Eric Parker, Plano, TX (US); Saeed Mir, Schaumburg, IL (US); Bradley Harvey, Vista, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 84 days.

(21) Appl. No.: 16/843,370

(22) Filed: Apr. 8, 2020

(65) Prior Publication Data
US 2021/0321278 A1    Oct. 14, 2021

(51) Int. Cl.
*H04W 24/10* (2009.01)
*H04L 5/00* (2006.01)
*H04L 9/40* (2022.01)
*H04W 72/04* (2009.01)
*H04W 48/18* (2009.01)
*H04L 1/00* (2006.01)

(52) U.S. Cl.
CPC ........... *H04W 24/10* (2013.01); *H04L 1/0026* (2013.01); *H04L 5/0048* (2013.01); *H04L 63/20* (2013.01); *H04W 48/18* (2013.01); *H04W 72/042* (2013.01)

(58) Field of Classification Search
CPC . G06N 20/00; H04L 41/0631; H04L 41/0816; H04L 43/16; H04L 41/5025; H04W 24/02; H04W 24/04; H04W 24/10; G06F 2009/45591
See application file for complete search history.

(56) References Cited

U.S. PATENT DOCUMENTS

2016/0104076 A1* 4/2016 Maheshwari .......... G06N 20/00
                                                            706/12
2017/0134237 A1* 5/2017 Yang ....................... H04L 43/16
(Continued)

OTHER PUBLICATIONS

Ted Dunning, et al, "Computing Extremely Accurate Quantiles Using t-Digests", Feb. 11, 2019, pp. 1-22, arXiv:1902.04023v1 [stat.CO].
(Continued)

*Primary Examiner* — Mansour Oveissi

(57) ABSTRACT

A processing system including at least one processor may obtain a request that identifies a region associated with a wireless communication network, identify sub-areas within the region, obtain performance indicator data for the sub-areas for a plurality of time periods from mobile devices within each sub-area, and apply an adaptive thresholding to the performance indicator data for each sub-area to determine one or more thresholds associated with the performance indicator data. The processing system may further identify a risk level, from among a plurality of risk levels, for each sub-area for at least one time periods based upon the one or more thresholds and the performance indicator data for each sub-area, where the one or more thresholds define one or more risk levels of the plurality of risk levels, and provide reporting data indicating the risk level for each sub-area for the at least one time period.

20 Claims, 6 Drawing Sheets

(56) References Cited

U.S. PATENT DOCUMENTS

2017/0272319 A1\* 9/2017 Sheen ................... H04W 24/02
2017/0353827 A1\* 12/2017 D'Alberto ............... H04W 4/02

OTHER PUBLICATIONS

Sergey Chernov, et al, "Anomaly Detection Algorithms for the Sleeping Cell Detection in LTE Networks", Department of Mathematical Information Technology, Computer Science, Engineering, 2015 IEEE 81st Vehicular Technology Conference, pp. 1-5.

Ilyas Alper Karatepe, et al., "Anomaly detection in cellular network data using big data analytics", ResearchGate, Jan. 2014, pp. 1-6, CTTC Catalan Telecommunications Technology Centre.

Jun Wu, et al., "CellPAD: Detecting Performance Anomalies in Cellular Networks via Regression Analysis", 2018, pp. 1-9, ISBN 978-3-903176-08-9 © IFIP.

New Architectures for Apache Sparktm and Big Data, White Paper, vmware, (2017), pp. 1-24.

"Spark Streaming Programming Guide", Spark Streaming-Spark 3.1.1 Documentation, downloaded Feb. 27, 2020, from https://spark.apache.org/docs/latest/streaming-programming-guide.html., 20 pages.

Pedro Casas, et al., "Machine-Learning Based Approaches for Anomaly Detection and Classification in Cellular Networks", tma2016-final50, downloaded from http://tma.ifip.org on Mar. 31, 2021, pp. 1-8.

\* cited by examiner

310

| STARTHOUR | MCRSIXM_ID | Prediction | Mean | Median | Computed_Thresholds_Lo_Mo_Hi | Info |
|---|---|---|---|---|---|---|
| 2019-07-11 03:00:00 | 15RYP7421 | 1 | -100.465290807 | -99.0 | -99.1977743866,-100.7768955524,-101.3437724226 | exceeded low treshhold of -99.1977743866 |
| 2019-07-11 09:00:00 | 15RYP7421 | 0 | -98.3776753061 | -100.0 | -99.2357578874,-100.7768955524,-101.3437724226 | Safe |
| 2019-07-11 13:00:00 | 15RYP7421 | 0 | -96.5178638118 | -97.0 | -99.2357578874,-100.7768955524,-101.3437724226 | Safe |
| 2019-07-12 02:00:00 | 15RYP7421 | 1 | -100.890918861 | -103.0 | -99.5168961742,-101.1900041847,-103.1191211133 | exceeded low treshhold of -99.5168961742 |
| 2019-07-13 22:00:00 | 15RYP7421 | 0 | -97.7868383405 | -101.0 | -100.863794332,-105.4249494043,-107.260202553 | Safe |
| 2019-07-14 23:00:00 | 15RYP7421 | 1 | -102.491189427 | -104.0 | -101.954519182,-105.4249494043,-107.260202553 | exceeded low treshhold of -101.954519182 |
| 2019-07-11 00:00:00 | 15RYP7721 | 1 | -102.106623586 | -105.0 | -101.680317185,-104.260173743,-105.015015075 | exceeded low treshhold of -101.680317185 |
| 2019-07-11 00:00:00 | 15RYP8014 | 0 | -97.4092852779 | -99.0 | -100.288847528,-101.394503492,-106.172569434 | Safe |
| 2019-07-11 01:00:00 | 15RYP8014 | 0 | -98.3644538918 | -99.0 | -100.288847528,-101.394503492,-106.172569434 | Safe |
| 2019-07-11 02:00:00 | 15RYP8014 | 0 | -99.1812977099 | -100.0 | -100.288847528,-101.394503492,-106.172569434 | Safe |

320

| STARTHOUR | CELL | RISK1 | RISK2 | RISK3 | MCRSID | LAT | LONG | ALERT_TYPE |
|---|---|---|---|---|---|---|---|---|
| 2019-07-11 03:00:00 | LAL04021_2B_1 | 1 | 0 | 1 | 015RYP7421 | 29.996869 | -90.158133 | Persistent Dominance |
| 2019-07-12 03:00:00 | LAL04021_9C_1 | 0 | 1 | 1 | 015RYP7421 | 29.996869 | -90.158133 | Absent Dominance |
| 2019-07-12 02:00:00 | LAL04021_9B_1 | 1 | 1 | 1 | 015RYP7421 | 29.996869 | -90.158133 | Persistent Dominance |
| 2019-07-12 03:00:00 | LAL04021_9C_1 | 0 | 1 | 1 | 015RYP7421 | 29.996869 | -90.158133 | Persistent Dominance |
| 2019-07-12 19:00:00 | LAL04021_9C_1 | 1 | 0 | 0 | 015RYP7421 | 29.996869 | -90.158133 | Persistent Dominance |
| 2019-07-12 22:00:00 | LAL04021_2B_1 | 0 | 1 | 0 | 115RYP7421 | 29.996869 | -90.158133 | Persistent Dominance |
| 2019-07-14 02:00:00 | LAL04021_9C_1 | 1 | 1 | 1 | 015RYP7421 | 29.996869 | -90.158133 | Persistent Dominance |
| 2019-07-11 03:00:00 | LAL00034_2A_1 | 1 | 0 | 0 | 015RYP7722 | 29.996592 | -90.125634 | Persistent Dominance |
| 2019-07-11 07:00:00 | LAL04099_9C_1 | 1 | 1 | 1 | 015RYP8218 | 29.962536 | -90.072184 | Absent Dominance |
| 2019-07-11 08:00:00 | LAL04535_9C_1 | 1 | 1 | 0 | 015RYP8118 | 29.996838 | -90.08276 | New Dominance |
| 2019-07-11 18:00:00 | LAL04099_3A_1 | 1 | 1 | 0 | 015RYP8218 | 29.962536 | -90.072144 | New Dominance |
| 2019-07-12 02:00:00 | LAL04034_3C_1 | 1 | 0 | 0 | 015RYP7722 | 29.996592 | -90.125634 | New Dominance |

FIG. 3

GRID REFERENCE SYSTEM WIRELESS NETWORK ANOMALY DETECTION AND VISUALIZATION

The present disclosure relates generally to cellular network operations, and more particularly to methods, computer-readable media, and apparatuses for identifying risk levels for sub-areas of a region for at least one time period based upon thresholds that are associated with performance indicator data of a wireless communication network and that are generated via adaptive thresholding.

BACKGROUND

Cellular network operators obtain a large number of measurements of key performance indicators (KPIs) with respect to various aspects of the cellular network. The KPIs are used for a variety of purposes such as network planning and upgrading, troubleshooting, load balancing between core network components, beam management, inter-cell coordination, and so forth.

SUMMARY

The present disclosure broadly discloses methods, non-transitory (i.e., tangible or physical) computer-readable storage media, and apparatuses for identifying risk levels for sub-areas of a region for at least one time period based upon thresholds that are associated with performance indicator data of a wireless communication network and that are generated via adaptive thresholding. For instance, in one example, a processing system including at least one processor may obtain a request (e.g., to calculate risk levels) that identifies a region associated with a wireless communication network, identify a plurality of sub-areas within the region, and obtain performance indicator data of the wireless communication network for each of the plurality of sub-areas for a plurality of time periods from mobile devices within each of the plurality of sub-areas. The processing system may then apply an adaptive thresholding to the performance indicator data of the wireless communication network for each of the plurality of sub-areas to determine one or more thresholds associated with the performance indicator data, identify a risk level, from among a plurality of risk levels, for each of the plurality of sub-areas for at least one time period of the plurality of time periods based upon the one or more thresholds and the performance indicator data of the wireless communication network for each of the plurality of sub-areas, where the one or more thresholds define one or more risk levels of the plurality of risk levels, and provide reporting data indicating the risk level for each of the plurality of sub-areas for the at least one time period.

BRIEF DESCRIPTION OF THE DRAWINGS

The present disclosure can be readily understood by considering the following detailed description in conjunction with the accompanying drawings, in which:

FIG. 3 illustrates sample reports identifying risks in a region of a wireless communication network, in accordance with the present disclosure;

To facilitate understanding, identical reference numerals have been used, where possible, to designate identical elements that are common to the figures.

DETAILED DESCRIPTION

Figure 1:
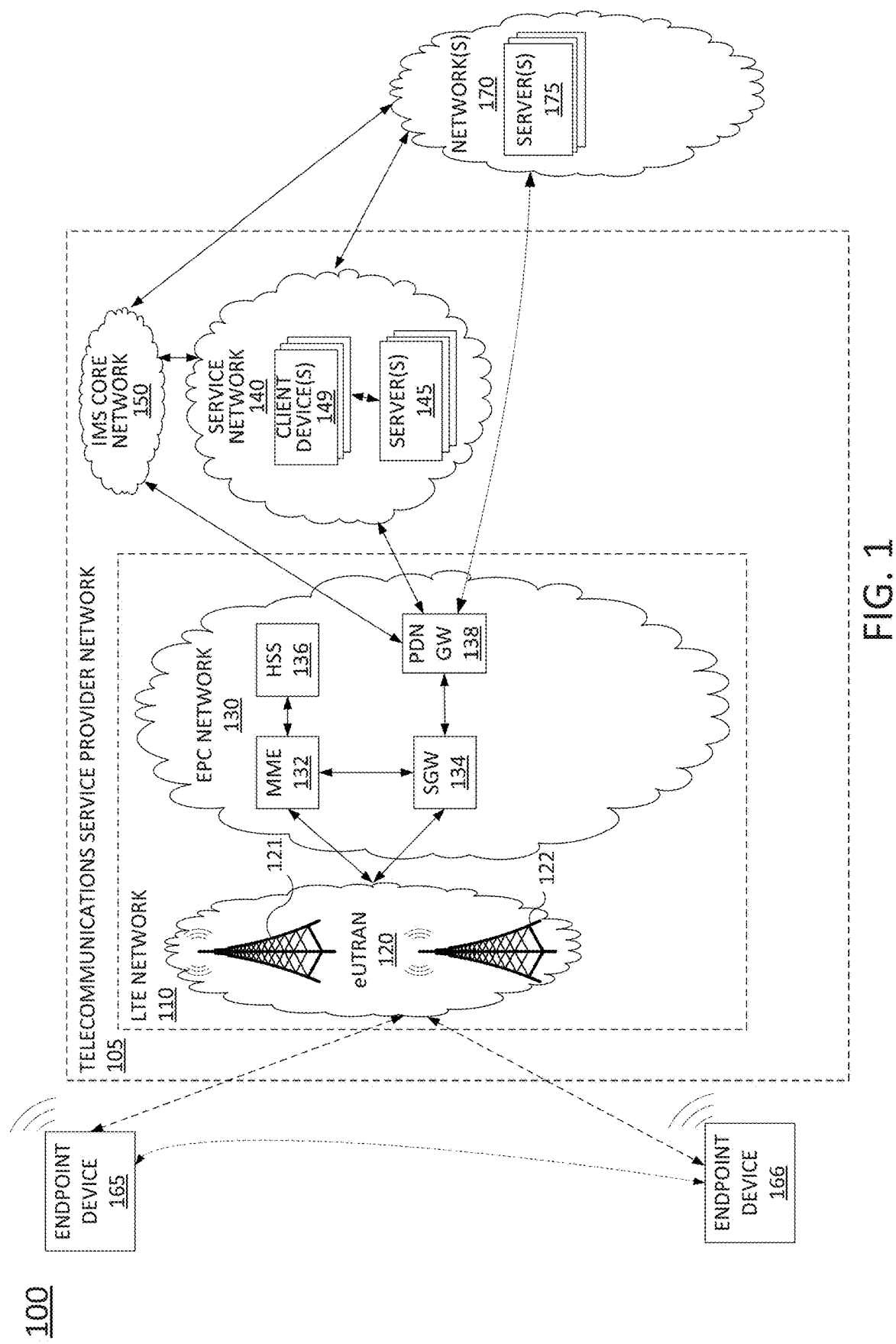
FIG. 1 illustrates an example of a system including a telecommunications service provider network, according to the present disclosure.

Examples of the present disclosure include methods, non-transitory (i.e., tangible or physical) computer-readable storage media, and apparatuses identifying risk levels for sub-areas of a region for at least one time period based upon thresholds that are associated with performance indicator data of a wireless communication network and that are generated via adaptive thresholding. In particular, examples of the present disclosure detect anomalies in wireless communication networks (e.g., cellular networks) using streaming performance indicator data from mobile endpoint devices as input, calculating adaptive thresholds over the performance indicator data within a history window, and comparing current measures of the performance indicator data with the calculated thresholds to determine whether there is risk or not. In one example, a report of risk level(s) is also generated, e.g., in near-real-time. In one example, the present disclosure enables a client device or system to select a relevant area for risk alerting and/or reporting (e.g., by selecting a geofence). In one example, the region is divided into sub-areas, e.g., of a grid reference system, such as Military Grid Reference System (MGRS), such as square kilometer bins and the like. The present disclosure may generate reports or records per sub-area (e.g., per MGRS bin) per hour or other time period. In one example, the reports, or records, may further determine and identify cells within sub-areas identified as having certain risk levels, and may report performance indicator data relevant to the particular cells.

The close-to real time reporting and alerting enables fast identification of problems, or risks, in the wireless network. In addition, the present disclosure reports risk in sub-areas (e.g., bins), because resources in the cellular network are shared. If one cell has problem, neighboring cells generally cover the troubled area. Since reporting is initially by sub-area, rather than by cell, the present disclosure is more focused on user experience. For instance, if a mobile endpoint device experiences low performance at a specific location (e.g., a MGRS bin shows low signal coverage), this condition may be caused by multiple cells. All cells covering that location share the responsibility. In one example, the present disclosure thus identifies sub-areas having risk. In addition, as a secondary level of reporting data, the present disclosure may additionally provide information regarding several cells serving the sub-area and which contribute the most samples to the collected performance indicator data in the current hour and in the history window for further consideration. In one example, reports and/or records may be processed for data visualization, such as using Tableau or other tools. In addition, in one example, the present disclosure may provide automated alerts, such as via email, text message, or the like, which may be requested by clients. Examples of the present disclosure therefore identify cellular network coverage outages/degradations that may impact user experience but that may not be readily noticeable from the network perspective. These and other aspects of the present disclosure are discussed in greater detail below in connection with the examples of FIGS. 1-6.

FIG. 1 illustrates an example network, or system 100 that may implement or support examples of the present disclosure for identifying risk levels for sub-areas of a region for at least one time period based upon thresholds that are associated with performance indicator data of a wireless communication network and that are generated via adaptive thresholding. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) core network 150. The system 100 may further include other networks 170 connected to the telecommunications service provider network 105. As shown in FIG. 1, the system 100 may connect endpoint devices 165 and 166 with devices, e.g., servers 175 in networks 170, application server 145 in service network 140, etc., with other endpoint devices (not shown) and/or with other components of telecommunications service provider network 105.

As illustrated in FIG. 1, each of the endpoint devices 165 and 166 may comprise, for example, a cellular telephone, a smartphone, a tablet computing device, a laptop computer, a wireless enabled wristwatch, or any other wireless and/or cellular-capable mobile telephony and computing devices (broadly, a "mobile device" or "mobile endpoint device"). In one example, endpoint devices 165 and 166 may be equipped for cellular and non-cellular wireless communication. For instance, endpoint devices 165 and 166 may include components which support peer-to-peer and/or short range wireless communications. Thus, each of the endpoint devices 165 and 166 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth.

In addition, in one example, each of the endpoint devices 165 and 166 may comprise all or a portion of a computing device or processing system, such as computing system 600 as described in connection with FIG. 6 below, specifically configured to perform various steps, functions, and/or operations in connection with examples of the present disclosure for identifying risk levels for sub-areas of a region for at least one time period based upon thresholds that are associated with performance indicator data of a wireless communication network and that are generated via adaptive thresholding. In one example, each of endpoint devices 165 and 166 may comprise an embedded application for performance indicator data/service metrics gathering and reporting that may be installed by a device manufacturer, and which may have elevated privileges with respect to device hardware. In one example, the embedded application may reside in a virtualization layer between the device hardware and a respective device operating system. In one example, the embedded application is inaccessible to device users or is at least hidden from user accounts.

In one example, the embedded application may be configurable over-the-air, e.g., by an operator of telecommunications service provider network 105, to load profiles which may specify how to collect performance indicator data, e.g., which performance indicator data to gather, when to record performance indicator data (such as according to a schedule and/or in response to detected events or triggers), how to process the performance indicator data to assemble into packages, how to filter gathered performance indicator data for reporting, when to report performance indicator data, which performance indicator data to report, and so forth. For instance, categories of service metrics/performance indicator data may include a reference signal received power (RSRP), a channel quality information (CQI), a signal to noise ratio (SNR), a number of carriers used, a number of sub-carriers used, an allocated uplink and/or downlink bandwidth, a utilized uplink and/or downlink bandwidth, a call success and/or failure rate, a session establishment success and/or failure rate, location information, connection information (e.g., a connection to a particular cell, a particular sector, a connection to a non-cellular access point), angle of arrival and/or angle of departure information (e.g., for beamformed wireless communications), and so forth. For each type of performance indicator data, there may be various derivative metrics, such as raw metrics, average, mean, and/or median values, start values and end values (e.g., during a recording period), peak values, and so forth (all of which may broadly be referred to a service metrics). Thus, endpoint devices 165 and 166 may be configured to gather and report various performance indicator data/service metrics to one or more network-based systems, e.g., for archiving, for analysis and insights, e.g., for network configuration and reconfiguration, for network planning, for coverage optimization, for device benchmarking, for network anomaly detection, and so forth. For example, endpoint devices 165 and 166 may be configured to upload gathered performance indicator data to servers 145. In one example, components of telecommunications service provider network 105 may also be configured to route/forward performance indicator data from endpoint devices 165 and 166 (and other endpoint devices) to servers 145.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the $3^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UEs), such as endpoint device 165 and/or endpoint device 166, may access wireless services via the eNodeBs 121 and 122 located in eUTRAN 120. It should be noted that any number of eNodeBs can be deployed in an eUTRAN.

In EPC network 130, network devices such as Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network 130 may comprise a Home Subscriber Server (HSS) 136 that contains subscription-related information (e.g., subscriber (or "user") profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices for providing services to subscribers, customers, and/or users. For example, telecommunications service provider network 105 may provide a cloud storage service, a web server hosting service, and other services. Alternatively, or in addition, one or more devices of service network 140 may be for providing services to internal users and/or automated systems of the telecommunications service provider network 105. As such, service network 140 may represent aspects of telecommunications service provider network 105 where infrastructure for supporting such services may be deployed. In the example of FIG. 1, service network 140 may include servers 145. In one example, each of the servers 145 may comprise all or a portion of a computing device or processing system, such as computing system 600 as described in connection with FIG. 6 below, specifically configured to perform various steps, functions, and/or operations for identifying risk levels for sub-areas of a region for at least one time period based upon thresholds that are associated with performance indicator data of a wireless communication network and that are generated via adaptive thresholding, in accordance with the present disclosure.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 6 and discussed below) or multiple computing devices collectively configured to perform various steps, functions, and/or operations in accordance with the present disclosure.

Figure 2:
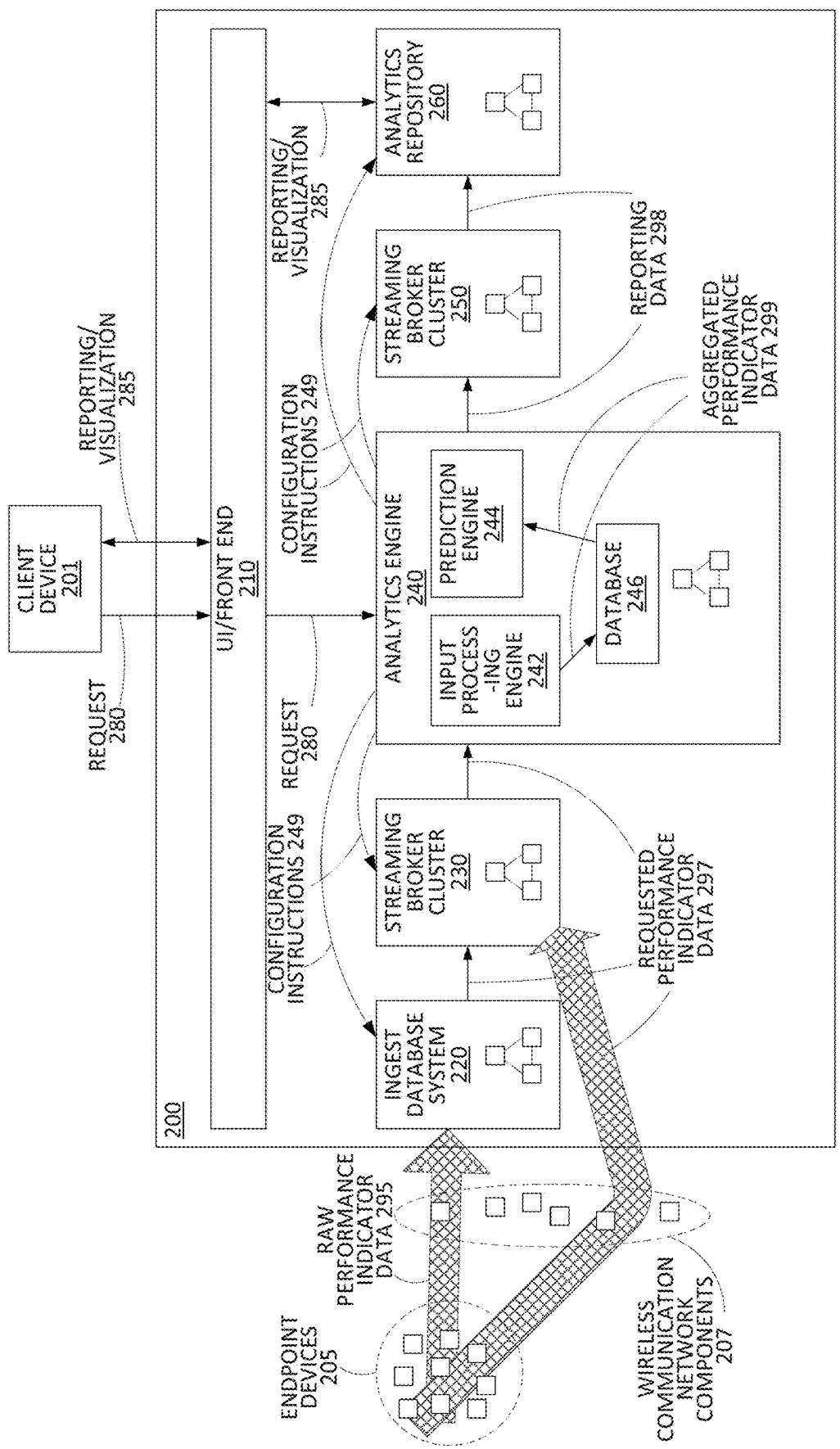
FIG. 2 illustrates an example system, e.g., a data storage, streaming, and risk level visualization and reporting system, in accordance with the present disclosure.
Figure 5:
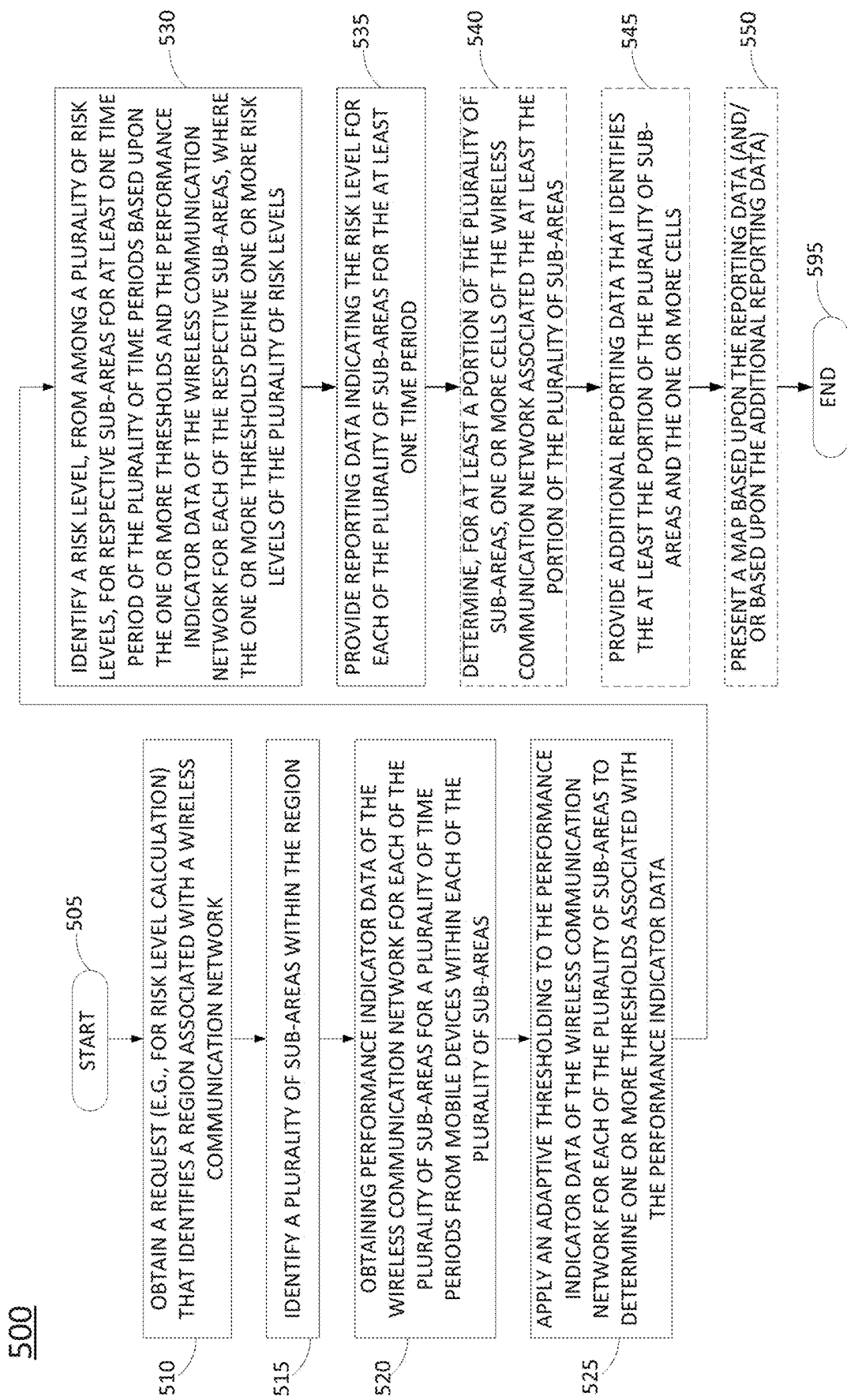
FIG. 5 illustrates a flowchart of an example method for identifying risk levels for sub-areas of a region for at least one time period based upon thresholds that are associated with performance indicator data of a wireless communication network and that are generated via adaptive thresholding.

In one example, the servers 145 may comprise a data storage, streaming, and risk level visualization and reporting system, e.g., a processing system or multiple processing systems configured to provide operations for identifying risk levels for sub-areas of a region for at least one time period based upon thresholds that are associated with performance indicator data of a wireless communication network and that are generated via adaptive thresholding, as described herein. For instance, an example method for identifying risk levels for sub-areas of a region for at least one time period based upon thresholds that are associated with performance indicator data of a wireless communication network and that are generated via adaptive thresholding is illustrated in FIG. 5 and described in greater detail below. In addition, an example system 200, e.g., a data storage, streaming, and risk level visualization and reporting system, is illustrated in FIG. 2 and described in greater detail below.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of networks. As illustrated in FIG. 1, networks 170 include one or more servers 175 which may each comprise all or a portion of a computing device or processing system, such as computing system 600 as described in connection with FIG. 6 below, specifically configured to perform various steps, functions, and/or operations in connection with examples of the present disclosure for identifying risk levels for sub-areas of a region for at least one time period based upon thresholds that are associated with performance indicator data of a wireless communication network and that are generated via adaptive thresholding. For instance, all or a portion of the functions of servers 145 may alternatively or additionally be provided by servers 175.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, service network 140, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 121 and 122, PDN GW 138, AS 145, and other components of system 100 are also omitted for clarity.

In accordance with the present disclosure, any one or more of the components of EPC network 130 may comprise network function virtualization infrastructure (NFVI), e.g., host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 132 may comprise a vMME, SGW 134 may comprise a vSGW, and so forth. In this regard, the EPC network 130 may be expanded (or contracted) to include more or less components than the state of EPC network 130 that is illustrated in FIG. 1. For instance, EPC network 130 may be expanded to include additional PDN gateways, e.g., in the form of vPGWs, additional serving gateways (SGWs), e.g., in the form of vSGWs, and so forth. In one example, the host devices may be deployed in one or more geographically diverse data centers. Accordingly, in one example, the network may be segregated into a number of zones, where different VNFs may be deployed in different zones depending upon the respective locations of the one or more data centers. The host devices and VNFs may be controlled by a software defined network (SDN) controller and/or a self-optimizing network (SON) orchestrator, for example.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, a 5G network and the like, an IEEE 802.11-based network, or a future technology or standard-based network, a network implementing various combinations of any one or more of the foregoing technologies, and so on). In one example, servers 145, servers 175, and/or other components may comprise cloud-based and/or distributed data storage and/or processing systems comprising one or more servers at a same location or at different locations. In addition, although the servers 145 and client devices 149 illustrated as components of service network 140, in other examples, any one or more of these components may be deployed in a different configuration. For instance, one or more of the servers 145 may comprise a component of service network 140, LTE network 110, IMS core network 150, and so forth, or may be fully or partially deployed in networks 170. Thus, these and other modifications are all contemplated within the scope of the present disclosure.

To further aid in understanding the present disclosure, FIG. 2 illustrates an example system 200, e.g., a data storage, streaming, and risk level visualization & reporting system. In accordance with the present disclosure, system 200 may comprise one or more computing devices or processing systems, such as one or more instances of computing system 600 as described in connection with FIG. 6 below, specifically configured to perform various steps, functions, and/or operations in connection with examples of the present disclosure for identifying risk levels for sub-areas of a region for at least one time period based upon thresholds that are associated with performance indicator data of a wireless communication network and that are generated via adaptive thresholding. For example, each of the components of system 200 may comprise respective configuration code which may cause one or more computing devices, a processing system, or system(s) to provide the respective operations or function of such component.

In addition, as referred to herein, "configuration code" may comprise computer-readable/computer-executable instructions, or code, which when executed by a processor, or processors, of a processing system within a same device or within distributed devices, may cause the processing system to perform various functions. For example, "configuration code" may include functions, procedures, rules, or the like, and may be expressed in one or more programming languages, and/or may be maintained as one or more binary files (e.g., executables). "Configuration code" may also include variables, data values, tables, objects, libraries, or other data structures or the like which may cause a processing system executing computer-readable instructions/code to function differently depending upon the values of the variables or other data structures that are provided. Configuration code may comprise a package of multiple associated files that when accessed and/or executed by a processing system, cause the processing system to provide a particular function.

As illustrated in FIG. 2, endpoint devices 205 may each comprise a mobile endpoint device. Endpoint devices 205 may gather service metrics, or "raw" performance indicator data 295, of a wireless communication network (e.g., a cellular network, a non-cellular wireless network, such as an IEEE 802.11/Wi-Fi network, a network utilizing IEEE 802.15, or the like, a multi-technology wireless network, such as a hybrid cellular/non-cellular wireless network, and so forth). In addition, endpoint devices 205 may forward the raw performance indicator data 295 to system 200. In one example, the system 200 may include an ingest database system 220 for obtaining and storing the raw performance indicator data 295 gathered from endpoint devices 205. For instance, ingest database system 220 may comprise a cluster of one or more servers providing a database and analytics platform with separate compute and storage resources (such as Vertica, for example). In one example, one or more components of the ingest database system 220 (e.g., a Vertica platform) may be configured to publish requested performance indicator data 297 to one or more "topics" of a data distribution and storage system, which may be subscribed to by various "subscribers." For instance, system 200 may further include a streaming broker cluster 230, e.g., an Apache Kafka "broker," a cluster or one or more servers, which may store data published to one or more topics. In such an example, analytics engine 240 may be configured as a "subscriber" to, or a "consumer" of the topic.

In one example, client device 201 may represent an automated system or user endpoint device of network operations personnel that may submit a request 280 for risk level calculation within a region of a wireless communication network. For instance, client device 201 may execute an application with a user interface that communicates with the user interface (Up/front end 210 of the system 200, and which enables a user to define a geographic region or "geofence," e.g., by presenting a map and allowing the user to select a region using a circle, a rectangle, or the like. For example, a user may define a region of interest of the wireless communication network by placing a circle around a portion of a city via a graphical user interface of the client device 201. The user interface may also enable the selection one or more performance indicators (or service metrics) of interest for the region. In addition, in one example, the user interface may enable the user to select a time period of interest. However, in another example, the time period may be a fixed window, e.g., from the previous week to the present hour or the last ended hour, from the previous two weeks to the present hour or the last ended hour, from the previous 360 hours to the present hour or the last ended hour, etc. In one example, the user interface may also enable the user to select a duration of the request. For instance, the user may specify that the selected performance indicator data 297 for a given region should be collected and processed for the next 24 hours, for the next week, for the next two weeks, etc.

In one example, the client device 201 may submit the request 280 to the analytics engine 240 of the system 200 via the UI/front end 210. In one example, the UI/front end 210 may identify sub-areas within the region specified in the request 280. For example, sub-areas may comprise a plurality of locations according to a grid reference system. For instance, in one example, the sub-areas may comprise Military Grid Reference System (MGRS) bins. In one example, locations, or sub-areas, are defined at a designated precision level of the grid reference system. In one example, the precision level may be specified in the request 280. In another example, the designated precision level may be selected (e.g., by the system 200) based upon a number of available samples of the requested service metrics/performance indicator data 297 for each sub-areas (and for each time period). To illustrate, the sub-areas may be smaller areas when there are more samples, and may be expanded to comprise larger areas when smaller areas have insufficient numbers of samples. Notably, MGRS bin size is flexible. For instance, a bin can be 1 km by 1 km, 100 m by 100 m, 10 m by 10 m, or even 1 m by 1 m. However, while smaller bin size may provide more accurate results, this may also utilize greater computational power, faster processing speeds, and more data samples. With the flexibility and capability of selecting the bin size(s), the system 200 is able to adapt the solution to a particular situation e.g., the current situation.

In one example, the system 200, via analytics engine 240, may then establish a topic, e.g., by sending configuration instructions 249 to one or more devices of ingest database system 220 to operate as publishers, or producers, and/or to configure to one or more devices of streaming broker cluster 230 to store the requested performance indicator data 297 as a topic. In one example, producers may determine if data matches a topic, and if so, may write the data to the topic. In this case, the one or more devices of ingest database system 220 may obtain the performance indicator data 295 and may extract any of the requested performance indicator data 297 therefrom to write to the topic. In one example, the performance indicator data 295 may include latitude/longitude raw data, which may be converted to the sub-area/bins via a mapping function. Thus, any of the performance indicator data 295 having the latitude/longitude raw data matching the sub-area(s) (and, in one example, also having a timestamp that is within the history window and/or the current hour) may be written to the topic.

It should also be noted that all or a portion of the requested performance indicator data 297 may be obtained more directly from the endpoint devices 205. For example, one or more of the wireless communication network components 207, such as a serving gateway, a packet data network gateway, intermediate routers, or the like may be configured as producers and may write at least one portion of the requested performance indicator data 297 for the region and/or the sub-areas for the plurality of time periods to the topic. The at least one portion of the requested performance indicator data 297 may comprise the performance indictor data for the current hour or other time period, and may be written to the topic as the requested performance indicator data 297 is obtained and observed at the one or more of the wireless communication network components 207. For instance, the analytics engine 240 may transmit instructions to the one or more of the wireless communication network components 207, or to a controller of such devices (e.g., a SDN controller and/or SON orchestrator) to configure the one or more of the wireless communication network components 207 to operate as producers and to write the selected performance indicator data to the topic. Thus, the at least one portion of the requested performance indicator data 297 may also be placed into the streaming broker cluster 230 and stored in association with the topic.

In addition, the analytics engine 240 may self-configure as a subscriber to the topic. The analytics engine 240 may therefore obtain the requested performance indicator data 297 via the input processing engine 242. In one example, the requested performance indicator data 297 is raw data, which may comprise a timestamp, e.g., in millisecond granularity, a latitude, and a longitude. In one example, the input processing engine 242 may pre-process the requested performance indicator data 297, convert latitude and longitude to MGRS bin ID, convert timestamp to HOUR and then aggregate them using the MGRS ID and HOUR combination as key. The aggregated performance indicator 299 contains basic statistics for each MGRS and HOUR, for example, mean, median, count, etc. This information is stored in database 246 for later use by prediction engine 244. In one example, database 246 may comprise at least one table of a resilient distributed dataset (e.g., that is stored in a distributed storage system comprising one or more servers). For instance, the analytics engine 240 may comprise an instance of Apache Spark, e.g., on top of Hive and Hadoop Distributed File System (HDFS). In such an example, the at least one table may comprise a Hive table.

In one example, the analytics engine 240 may perform various operations using the aggregated performance indicator data 299 that is stored in database 246. For instance, the analytics engine 240 may apply an adaptive thresholding to the aggregated performance indicator data 299 for sub-areas within the region to determine one or more thresholds associated with the aggregated performance indicator data 299. The analytics engine 240 may then identify a risk level for each of the sub-areas for each of a plurality of time periods based upon the one or more thresholds and the aggregated performance indicator data 299 for each of the sub-areas. In addition, the analytics engine 240 may generate reporting data 298 indicating the risk level for each of the sub-areas for each of the plurality of time periods.

Notably, Kafka streaming provides close to real time data for the requested performance indicator data 297, e.g., hourly up to the current hour, current up to the last 30 minutes, etc. In one example, the analytics engine 240 implements a decoupled architecture for read operations (input) and prediction (output). For instance, input processing engine 242 and prediction engine 244 may separately interact with the database 246 (e.g., a Hive table). For instance, both the input processing engine 242 and the prediction engine 244 may run concurrently on a continuous basis. The prediction engine 244 does not have to wait for the input processing engine 242 to finish operations. In one example, the analytics engine 240 may be implemented in Python and PySpark (Python application programming interface (API) for Spark) code, which in conjunction with Hive storage, provides for improved speed of computations on large data sets, such as the aggregated performance indicator data 299.

In one example, the prediction engine 244 may calculate adaptive thresholds, e.g., low (L), medium (M), and high (H) risk thresholds using the aggregated performance indicator data 299. For instance, in one example, the present disclosure employs a moving history window. With a fixed window size, such as 15 days/360 hours, the window moves along with the processing hour. This adapts to the seasonality and user behavior. In one example, the prediction engine 244 may use t-digest to rank the aggregated performance indicator data 299 within the history window (for example: 0.1% as high, 1% as moderate, 8% as low thresholds, etc.). In one example, the thresholds may be recalculated periodically (e.g., each hour, every 6 hours, every 12 hours, etc.), and may be different for each sub-area/bin.

The prediction engine 244 may then inspect the aggregated performance indicator data 299 from the current hour (e.g., the hour most recently ended) to determine whether it exceeds one or more of the thresholds. In one example, a check-pointing design allows the prediction engine 244 to know where to resume the computation in case the input processing engine 242, the prediction engine 244, and/or other component(s) of the system 200 is/are halted unexpectedly.

In one example, the prediction engine 244 may generate reporting data 298, e.g., a report and/or records for respective sub-areas indicating the risk levels determined via the comparison of the aggregated performance indicator data 299 (e.g., the current/most recent hour data) to the adaptive thresholds that are calculated (for instance: (0) safe—if observation>L; (1) low risk—if M<observation<=L; (2) moderate risk—if H<observation<=M; (3); high risk—if observation<=H). It should be noted that in other examples, risk levels and associated thresholds may be reversed in the order of progression (e.g., higher risk for higher values), may be defined by magnitudes instead of percentages, and so forth. In one example, the reporting data 298 may also include the aggregated performance indicator data 299 in the same format as stored in database 246 and/or summary form.

In one example, the reporting data 298 may be further output/forwarded to an analytics repository 260, e.g., for report visualization, alert messaging, and so forth. In one example, the analytics engine 240 may establish a second topic to which it may publish the reporting data 298 (e.g., as a Kafka "producer"). In addition, the analytics engine 240 may establish the analytics repository 260 as a consumer that is subscribed to the second topic. In one example, and as illustrated in FIG. 2, a different streaming broker cluster 250 may be used to deliver the reporting data 298 from the analytics engine 240 to the analytics repository 269. However in another example, the streaming broker cluster 250 may be the same as streaming broker cluster 230. In one example, the analytics repository 260 may comprise a cluster of one or more servers providing a database and analytics platform with separate compute and storage resources (such as a second Vertica instance, for example). The streaming broker cluster 250 and analytics repository 260 may further be configured via additional configuration instructions 249 from the analytics engine 240.

Figure 4:
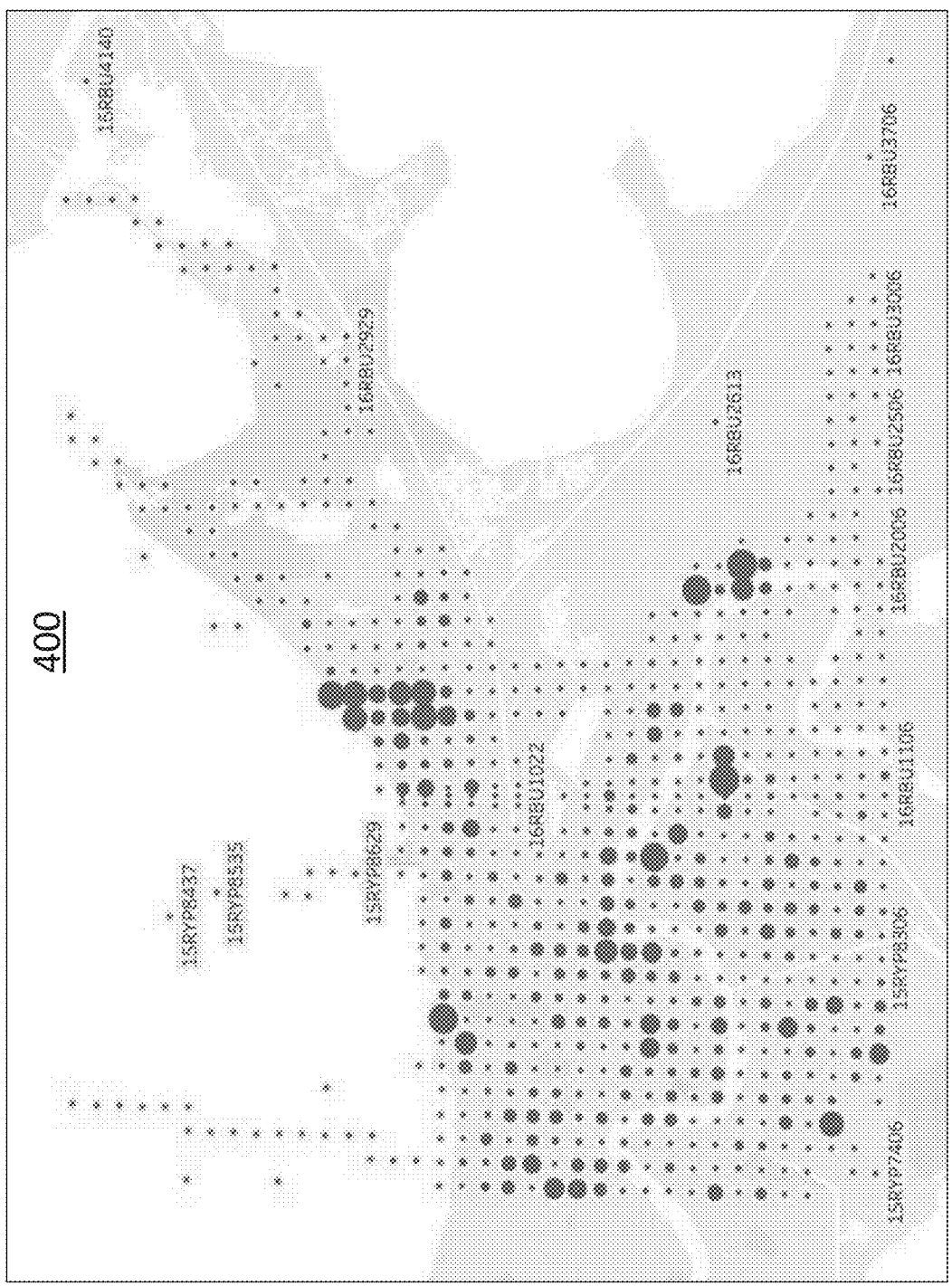
FIG. 4 illustrates an example map for visualizing risks in sub-areas of a region associated with a wireless communication network, in accordance with the present disclosure.

As such, the analytics repository 260 may store the reporting data 298, and may also provide a platform for client device 201 (and/or other client devices) to interact with the reporting data 298, to visualize the reporting 298 data, etc. For instance, client device 201 (and/or one or more different client devices) may inspect the reporting data 298 that is maintained by the analytics repository 260, may generate visualizations of the reporting data, may manipulate the reporting data, and so forth via reporting/visualization communications 285. For instance, in one example, interactions between the client device 201 and analytics repository may also be facilitated via the UI/front end 210. Examples of table-based and map-based graphical visualizations are illustrated in FIGS. 3 and 4 and discussed in greater detail below.

It should be noted that although a UI/front end 210, an ingest database system 220, streaming broker clusters 230 and 250, analytics engine 240, and an analytics repository 260 are described as distinct components of system 200, in one example, any one or more of these component systems may fully or partially comprise the same, shared hardware. Similarly, although FIG. 2 appears to illustrate a particular architecture for system 200, in other, further, and different examples, an alternative arrangement may be deployed. For instance, Kafka or a similar streaming architecture may also be used to initially populate the ingest database system 220 with the performance indicator data/service metrics 295 obtained from endpoint devices 205. In another example, ingest database system 220 may comprise a Kafka broker/cluster, where components of the wireless network (not shown) and/or the endpoint devices 205 may be configured as publishers/producers writing the performance indicator data/service metrics 295 to one or more topics. In such an example, the analytics engine 240 may comprise a subscriber to the topic.

It should also be noted that although the system 200 is illustrated as an integrated system, in one example, one or several of the components of the system 200 may instead be external to the other components. For instance, the ingest database system 220, the streaming broker cluster 230, and/or the streaming broker cluster 250 may be separate from the system 200, either controlled by a same entity, but utilizing a different physical infrastructure, or comprising physical infrastructure controlled by a different entity, but that is configurable via instructions from the system 200 (e.g., the configuration instructions 249 from the analytics engine 240).

To aid in understanding the present disclosure, FIG. 3 illustrates sample reports, e.g., risk reports identifying risks in a region of a wireless network, in accordance with the present disclosure. For instance, a first report 310 may comprise an "anomaly detection full report" which may include various columns/fields relating to a start hour, a sub-area/bin identifier (e.g., MGRS1KM_ID, for 1 km×1 km MGRS bins), and a prediction (e.g., a risk level/score from 0-3 as noted above). As shown in FIG. 3, the first report 310 may also include columns/fields for mean and median values of the subject performance indicator data (e.g., reference signal received power (RSRP)), the computed adaptive thresholds upon which the risk predication is determined, and additional information, such as text description of the risk identified. It should be noted that the first report 310 as shown in FIG. 3 is just one illustrative representation of a report that may be used for visualizing the reporting data. For instance, in another example, the first report 310 may be expanded to include a column/field for a number of samples collected for the performance indicator data for a sub-area/bin for the hour. It should also be noted that the first report 310 may include gaps in the hours based upon the specifics of the client's request. Alternatively, or in addition, there may be gaps in the reported hours if there are insufficient samples for that sub-area/bin for that hour. For instance, it may be preferred to omit such records so as to avoid making decisions based upon insufficient or incomplete data.

In one example, multiple reports may be used to visualize the reporting data in different formats, with different information, and so forth. In this regard, the second report 320 may comprise an "anomaly detection alert report" which may contain records relating to cells which may be associated with sub-areas (e.g., MGRS bins, identified by MGRSID). For instance, as shown in FIG. 3, the second report 320 includes columns/fields for the start hour, the cell (by cell identifier), columns for risk levels 1-3, with an indicator (1) of the risk level for the hour, the associated sub-area/bin, the latitude and longitude of the bin, and an "alert type." In one example, not all cells associated with a detected risk for a particular hour at a particular sub-area are listed in the second report 320. For instance, those cells contributing the most samples to the performance indicator data for the sub-area for that time period may be listed (e.g., the top cell, the top two cells, the top three cells, etc.). The "alert type" may have values that include "persistent dominance," "absent dominance," and "new dominance." For instance, if a cell consistently appears in the top 3 dominance list in the second report 320 in both a history window and in a current hour, it may be categorized as a "persistent dominance." If a cell doesn't appear in the top 3 dominance list in the history window but appears in the current hour, the cell may be labeled as a "new dominance." If a cell appears in the top 3 dominance list in the history window, but not in the current hour, this cell may be labeled as an "absent dominance." It should again be noted that the second report 320 is just one example of how risks identified in the reporting data may be visualized in accordance with the present disclosure. For instance, in another example, the second report 320 may instead contain a single column with the risk level being identified as 1-3 (e.g., instead of a 1 or zero label being used for three different columns). In addition, with respect to both the first report 310 and the second report 320, it should be noted that these reports may be manipulated to present records in different orders, such as arranged in descending order of risk level, arranged by ascending order of mean performance indicator data values (e.g., by ascending order of mean RSRP), and so forth. In another example, additional service metrics/performance indicator data may also be presented, e.g., in addition to risk levels and service metrics for RSRP. In still another example, the first report 310 and the second report 320 may be for reporting data relating to one or more other types of performance indicator data, such as risk levels relating to CQI, SNR, a call success and/or failure rate, a session establishment success and/or failure rate, or the like. Thus, these and other modifications are all contemplated within the scope of the present disclosure.

FIG. 4 illustrates an example map 400 for visualizing risks in sub-areas of a region. For instance, each of the circles in the map 400 may represent a sub-area, or bin, such as a MGRS 1 km×1 km bin. In the present example, the boundaries of the map 400 may correspond to a region, or geofence, that is selected by a client. For ease of illustration, only some of the sub-areas are labeled with a bin identifier, such as 15RYP8437, 15RYP8538, etc. In one example, the map 400 may be presented via a display screen of a client device. In addition, in one example, the client device may present a user interface that enables a user to select any of the sub-areas/bins to obtain the bin identifier, details regarding the service metrics/performance indicator data of the bin, the risk level(s) for one or more time periods, and so forth. In one example, each circle represents a center of a respective sub-area/bin, and a size of the circle may represent an aggregated risk level, or severity. For instance, the size of the circle may represent the number of time periods for which a sub-area/bin is determined to be risk level 3 (highest risk) over a selected time window (e.g., over the last 6 hours, 12 hours, 48 hours, etc.). It should be noted that FIG. 4 is just one example of a map-based visualization that may be provided in accordance with the present disclosure. For instance, in another example, the map 400 may present similar indicators by cell and/or sector. Notably, the second report 320 of FIG. 3 illustrates that those cells contributing the most samples to sub-areas/bins with detected risks may be tracked. Accordingly, those cells may be similarly visualized in an alternative example of the map 400. For instance, the cell locations may be known to the network operator and may be placed on the map 400 accordingly. In this case, larger circles may represent cells contributing more samples to sub-areas/bins at risk level 3 over the most time periods within a selected time window. Thus, these and other modifications are all contemplated within the scope of the present disclosure.

It should also be noted that as an alternative or in addition to the reporting data visualizations of FIGS. 3 and 4, the present disclosure may also provide alerts/notifications based upon risk levels that are determined in accordance with adaptive thresholds for different sub-area for different time periods based upon the performance indicator data (e.g., "aggregated" performance indicator data that may be keyed by MGRS bin and hour). For example, text-message alerts, email alerts, messaging via a custom/dedicated application, or the like may be sent to network operations personnel, other automated systems, and so forth. In one example, clients may customize alerts, such as how often alerts are to be sent, where the alerts are to be sent (e.g., specific devices, email addresses, telephone numbers, URLs, etc.), and the thresholds for sending alerts (e.g., risk level 2 or greater, risk level 3 only, risk level 2 or greater for 3 or more hours within a 24 hour window, etc.).

FIG. 5 illustrates a flowchart of an example method 500 for identifying risk levels for sub-areas of a region for at least one time period based upon thresholds that are associated with performance indicator data of a wireless communication network and that are generated via adaptive thresholding. In one example, steps, functions and/or operations of the method 500 may be performed by a device and/or processing system as illustrated in FIG. 1, e.g., by one or more of servers 145, or any one or more components thereof, or by server(s) 145 and/or any one or more components thereof in conjunction with one or more other components of the system 100, such as one or more elements of LTE network 110, the client device(s) 149, the endpoint devices 165 and 166, and so forth. In one example, steps, functions and/or operations of the method 500 may be performed by the system 200 as illustrated in FIG. 2, or any one or more components thereof. In one example, the steps, functions, or operations of method 500 may be performed by a computing device or processing system, such as computing system 600 and/or hardware processor element 602 as described in connection with FIG. 6 below. For instance, the computing system 600 may represent any one or more components of the system 100 or the system 200 that is/are configured to perform the steps, functions and/or operations of the method 500. Similarly, in one example, the steps, functions, or operations of the method 500 may be performed by a processing system comprising one or more computing devices collectively configured to perform various steps, functions, and/or operations of the method 500. For instance, multiple instances of the computing system 600 may collectively function as a processing system. For illustrative purposes, the method 500 is described in greater detail below in connection with an example performed by a processing system. The method 500 begins in step 505 and proceeds to step 510.

At step 510, the processing system obtains a request (e.g., to calculate risk levels) that identifies a region associated with a wireless communication network. The request may be received from a client device, e.g., a user endpoint device or an automated system, such as an SDN controller and/or SON orchestrator. In one example, the region, or geofence, may be defined by a circle, an ellipse, a polygon, or custom shape via a client device, such as by placing the geofence over a map via a graphical user interface. In one example, the request may include a precision level for sub-area sizing. In one example, the request may include a selection of one or more types of performance indicator data to be collected and for which reporting, alerting, and or visualization is desired. For instance, the performance indicator data may include RSRP, RSRQ, SNR, SINR, uplink bandwidth, downlink bandwidth, session drop rate, a call drop rate, and so forth. In one example, the request may include a specification for one or more thresholds for risk level determination. For instance, the request may specify percentages of 0.01, 0.1 and 8 percent as cutoffs for low risk, moderate risk, and high risk. These illustrative percentages may represent deviations from a mean or median of performance indicator data for a given sub-area within a historical window (e.g., a time block comprising 48 hours, 1 week, two weeks, 360 hours/15 days, etc.). In one example, the request may specify the historical window. In one example, the historical window may comprise a plurality of time periods of interest. In another example, the request may alternatively or additionally identify a plurality of time period of interest for which performance indicator data is be collected (and for which reporting, alerting, and or visualization may also be desired). It should be noted that the plurality of time periods may be sequential, but need not be. For instance, a request may be interested in typical commuting hours of 6 am to 9 am and 4 pm to 7 pm. Thus, other hours of the day may be omitted.

At step 515, the processing system identifies a plurality of sub-areas within the region. For instance, the plurality of sub-areas may comprise a plurality of locations according to a grid reference system, such as MGRS. In one example, the sub-areas may be defined at a designated precision level of the grid reference system, e.g., as specified in the request, as specified in a user or client profile, an organization profile, etc. In another example, the precision level may be selected dynamically in accordance with the following steps of the method 500 (e.g., based upon the number of available samples for several possible bin sizes).

At step 520, the processing system obtains performance indicator data of the wireless communication network for each of the plurality of sub-areas for a plurality of time periods from mobile devices within each of the plurality of sub-areas. In one example, the performance indicator data may be written to at least one database (such as a database having a table format, or other format) of a resilient distributed dataset of a storage system (e.g., a distributed storage system). For instance, the storage system may comprise a cluster computing framework, or analytics engine (such as analytics engine 240 of FIG. 2) for managing the resilient distributed dataset, such as Apache Spark (e.g., on top of Hive and HDFS, where the at least one table may comprise a Hive table). It should be noted that in one example, the resilient distributed dataset and/or storage system may be considered to be part of the cluster computing framework/analytics engine. In one example, the performance indicator data may be streamed from an ingest database system to the resilient distributed dataset in accordance with a streaming data platform (e.g., Apache Kafka). For instance, mobile devices may periodically upload performance indicator data to the ingest database system as configured by an operator of the wireless communication network, regardless of whether there is a current request in accordance with the present method 500.

In one example, the processing system may establish a topic, where one or more components of the ingest database system may be configured as producers, one or more devices may be configured as a Kafka cluster, and the resilient distributed dataset (and/or the cluster computing framework/analytics engine thereof) may comprise a consumer. In one example, the ingest database system may be part of the processing system that performs the method 500. In another example, the ingest database system may be a separate system, where the processing system interacts with and configures the ingest database system as a producer via remote instructions, e.g., via an application programming interface (API) of the ingest database system.

Alternatively, or in addition, one or more components of the wireless communication network, such as a serving gateway, a packet data network gateway, intermediate routers, or the like may be configured as producers and may write to the topic the relevant performance indicator data for the region and/or the sub-areas for the plurality of time periods. For instance, the processing system may transmit instructions to the one or more components of the wireless communication network, or to a controller of such devices (e.g., a SDN controller and/or SON orchestrator) to configure the one or more components to operate as producers and to write the selected performance indicator data to the topic. Thus, the performance indicator data may be obtained in real-time, or near-real-time from the mobile devices within each of the plurality of sub-areas. In addition, the performance indicator data may alternatively or additionally be obtained from a network-based storage system, such as ingest database system 220 of FIG. 2.

In one example, the performance indicator data may be obtained in a raw format from mobile devices and/or a network-based storage system (e.g., including a timestamp in millisecond granularity, or the like, and location information in latitude and longitude format). The performance indicator data may then be pre-processed/converted to a format with MGRS bin and hour as a key, and stored into the at least one database of the resilient distributed dataset of the storage system (e.g., as "aggregated" performance indicator data).

At step 525, the processing system applies an adaptive thresholding to the performance indicator data of the wireless communication network for each of the plurality of sub-areas (e.g., over the plurality of time periods) to determine one or more thresholds associated with the performance indicator data. In one example, the applying the adaptive thresholding comprises organizing the performance indicator data in a t-digest data structure. Accordingly, in one example, the one or more thresholds associated with the performance indicator data are determined in accordance with the t-digest data structure for the performance indicator data. Notably, t-digest provides fast estimation of these thresholds for large datasets. This may be particularly beneficial where the processing system may contemporaneously handle different requests for one or more clients, each of which may require substantial processor, memory, storage, and/or network bandwidth resources.

In one example, the thresholds are determined in accordance with a specification associated with the request (e.g., that may be included in the request and/or accompany the request that may be obtained at step 510). For instance, the specification may identify percentages to be used as cutoffs for risk levels of a plurality of risk levels. Accordingly, step 525 may comprise determining values for the performance indicator data corresponding to these percentages (where such values may comprise the thresholds that may be used to determine different risk levels for new performance indicator data (e.g., for the current time period, such as the current hour or most recently ended hour, etc.)). It should be noted that in other, further, and different examples, the specification of a percentage, or percentages, for the one or more thresholds may be a setting contained in a profile associated with the client submitting the request, an organization, a unit, or division of the client, etc.

As also noted above, in one example, the precision level (e.g., the sub-area/bin size) may be selected dynamically. For instance, for all or a portion of the plurality of sub-areas, there may be an insufficient number of samples to accurately calculate risk levels at a particular sub-area size. In one example, a minimum number of samples (and/or a minimum number of samples per time period) may be specified in the request, may be set by a system operator, may be specified in a client profile, an organization profile, etc. If the minimum number of samples is not available, the processing system may increase the sub-area/bin size to a next available size and perform the same or similar operations with respect to the performance indicator data for the larger sub-area. In one example, this dynamic sub-area size adjustment may be made on a per-sub-area basis. In another example, the adjustment may be made across the entire region if there are an insufficient number of samples of the performance indicator data for any sub-area(s) within the region.

At step 530, the processing system identifies, for at least one time period of the plurality of time periods, whether there is risk for each of the plurality of sub-areas. In addition, for sub-areas in which a risk is identified, step 530 further identifies a risk level, from among a plurality of risk levels, based upon the one or more thresholds and the performance indicator data of the wireless communication network for each of the respective sub-areas. For instance, the thresholds may be set for each sub-area in accordance with the collected performance indicator data over a historical window comprising at least a portion of the plurality of time periods. The thresholds may then be applied to the performance indicator data for each of the plurality of sub-areas for the at least one time period (where the at least one time period may comprise a current or most recently ended time period, such as the current or most recently ended hour). In one example, the processing system may perform the operations of step 530 over several hours (or other time periods) and may make risk level determinations for the sub-areas of the region over the several hours (or other time periods).

At step 535, the processing system provides reporting data indicating the risk level for each of the plurality of sub-areas for the at least one time period. In one example, step 535 may include publishing the reporting data to a second topic. For instance, the processing system may establish a second data stream for the reporting data, where the cluster computing framework (e.g., an instance of Apache Spark, or the like) may be configured as a producer of the reporting data and an analytics repository (such as analytics repository 260 of FIG. 2 may be configured as a subscriber to the second topic). In one example, step 535 may alternatively or additionally comprise presenting the reporting data (e.g., to the client submitting the request or to a different client that is requesting the reporting data). For example, the reporting data may include a plurality of entries, each comprising: a time period of the plurality of time periods, a sub-area of the one or more sub-areas, and the risk level for the time period. The reporting data may further include at least one metric associated with the performance indicator data for the sub-area for the time period. For instance, the at least one metric may include: a mean of the performance indicator data for the sub-area for the time period, a median of the performance indicator data for the sub-area for the time period, a highest threshold, a moderate threshold, and/or a lowest threshold of the performance indicator data for the sub-area for the time period, a number of samples of the performance indicator data for the sub-area for the time period, and so forth. In one example, the reporting data may be provided and/or presented in table or chart form (such as first report 310 of FIG. 3).

At optional step 540, the processing system may determine, for at least one portion of the plurality of sub-areas, one or more cells of the wireless communication network associated the at least one portion of the plurality of sub-areas. For instance, the at least one portion of the plurality of sub-areas may comprise sub-areas of the plurality of sub-areas having risk levels which exceed a designated risk level of the plurality of risk levels. For example, a client may be interested in having information regarding cells that may affect the risk levels in the sub-areas with moderate to severe risk levels (e.g., levels 2 and 3 on a scale of 0-3). However, it should be noted that in one example, optional step 540 may involve all of the sub-areas within a region. In one example, optional step 540 may comprise performing a mapping between the sub-areas and geographic coverage information for cells and/or sectors of cells that may be maintained by the processing system or which are otherwise accessible to the processing system. For instance, sub-areas may be designated by a latitude and longitude of a central point, and may have known dimensions, e.g., 1 km×1 km, 100 m×100 m, etc. In one example, the processing system may utilize a database of cell locations, sector bearings, antenna tilt, maximum transmit power, and so forth to identify sub-areas falling within and/or overlapping a cell footprint, or coverage area.

At optional step 545, the processing system may provide additional reporting data that identifies the at least one portion of the plurality of sub-areas and the one or more cells. For example, the additional reporting data may be added to the reporting data that is provided and/or presented at step 535. In one example, a different chart or table may be presented with the additional reporting data (such as second report 320 of FIG. 3).

At optional step 550, the processing system may present a map based upon the reporting data, wherein the map indicates, for each respective sub-area of at least one portion of the plurality of sub-areas, a visual indicator associated with (e.g., indicative of) the risk level of the respective sub-area for at least one of the plurality of time periods. In one example, the visual indicator may be in accordance with an average or aggregate score based upon risk levels over a historical window or other selected time blocks, and so forth. In one example, the at least one time period may be specified in the request that is obtained at step 510. In another example, the at least one time period may be designated in an additional request. For instance, the map may be presented in response to a specific request, from the same client or from a different client, for a map-based visualization for the at least one time period. In one example, the map may be based upon the additional reporting data that may be provided at optional step 545. For example, the map may indicate the at least one portion of the plurality of sub-areas and/or the one or more cells. In one example, visual indicators may be used to differentiate cells that contribute the most samples to sub-areas/bins at or above a selected risk level over multiple time periods.

In one example, step 535 and/or any one or more of optional steps 540, 545, or 550 may be performed in accordance with an analytics repository (which may comprise part of the processing system). In one example, any one or more of these steps may be performed automatically, may be performed in response to a trigger, may be performed in response to another request from the same client or a different client for the reporting data, e.g., in table or chart form, in map form, or both, and so on.

Following step 535 or any one or more of optional steps 540-550, the method 500 may proceed to step 595. At step 595, the method 500 ends.

It should be noted that the method 500 may be expanded to include additional steps, or may be modified to replace steps with different steps, to combine steps, to omit steps, to perform steps in a different order, and so forth. For instance, in one example the processing system may repeat one or more steps of the method 500, such as steps 510-535, steps 510-550, etc. For example, the processing system may obtain an additional request from the same or a different client and may collect the relevant performance indicator data from mobile devices in a region, may determine one or more thresholds, may calculate risk levels for sub-areas of the region, and forth. Alternatively, or in addition, one or more steps of the method 500 may be repeated for one or more successive time periods to collect new performance indicator data from mobile devices in the region, to recalculate the threshold(s) (e.g., for a sliding historical time window), and to provide new risk level determinations for sub-areas of the region for the one or more successive time periods. For instance, at least a portion of the method 500 may be repeated as each time period (e.g., each hour) completes, where risk level determinations may be made for the sub-areas for the most recently completed hour (or other time period).

In one example, optional steps 540 and 545 may be performed before or in conjunction with the operations of step 535. For instance, optional steps 540 and 545 may be performed via an analytics repository (such as analytics repository 260 of FIG. 2, which may comprise a Vertica instance, in one example) or may be performed via an analytics engine, or cluster computing framework (such as analytics engine 240) before the providing of the reporting data. In one example, multiple topics may be established for transferring the performance indicator data to the cluster computing framework, e.g., instead of a single topic being used to achieve the same result of the selected performance indicator data being obtained. In addition, a single stream (e.g., a Kafka stream) may be established end-to-end, e.g., where the cluster computing framework/analytics engine may comprise a Kafka stream processor, and the analytics repository may comprise a subscriber.

In one example, the method 500 may be expanded to include providing alerts/notifications based upon risk levels that are determined in accordance with adaptive thresholds for different sub-areas for different time periods based upon the performance indicator data. For example, text-message alerts, email alerts, messaging via a custom/dedicated application, or the like may be sent to network operations personnel, other automated systems, and so forth. For instance, a network operator may elect to receive alerts for any "persistent dominance," e.g., when any cell is first determined to be a "persistent dominance" in a sub-area in a certain hour in which a risk is identified. In one example, clients may customize alerts, such as how often alerts are to be sent, where the alerts are to be sent (e.g., specific devices, email addresses, telephone numbers, URLs, etc.), the thresholds for sending alerts (e.g., risk level 2 or greater, risk level 3 only, risk level 2 or greater for 3 or more hours within a 24 hour window, etc.). In such an example, the method 500 may further include obtaining a request to receive alerts, which may comprise alert criteria/triggers, such as time period(s) and risk level(s) for which alerts should be sent. Thus, these and other modifications are all contemplated within the scope of the present disclosure.

In addition, although not expressly specified above, one or more steps of the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 5 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 6:
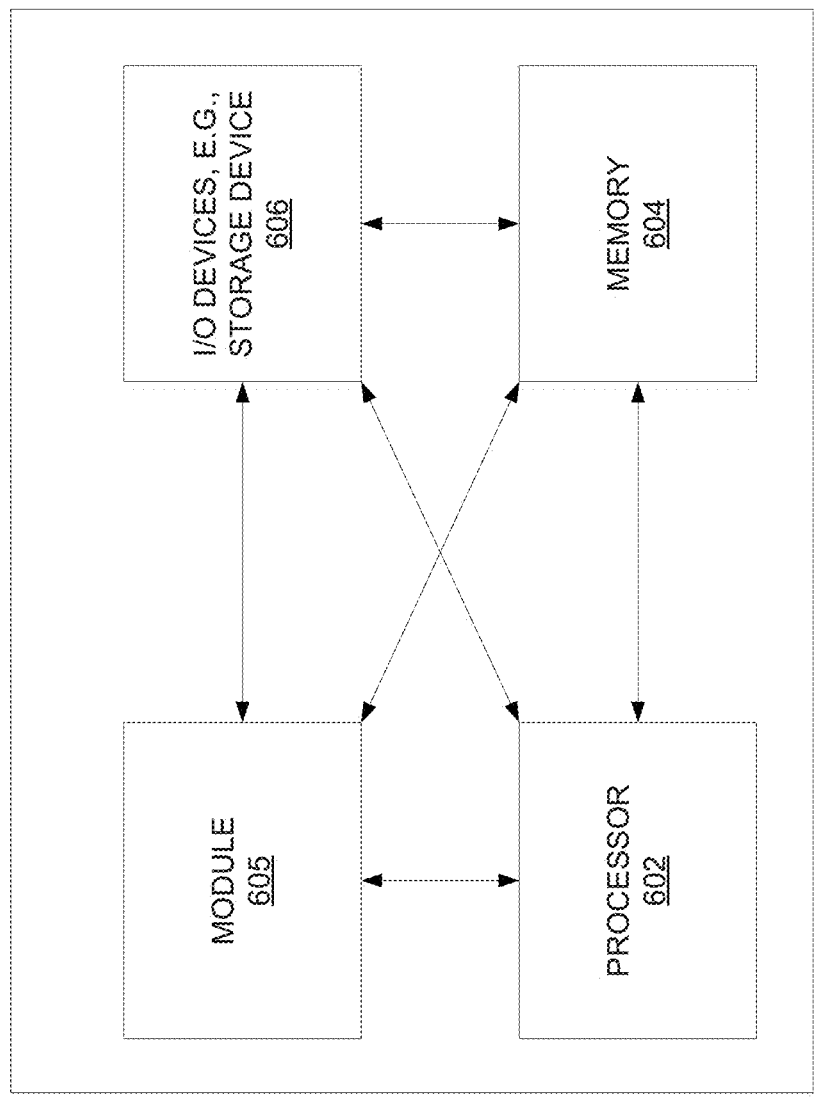
FIG. 6 illustrates a high-level block diagram of a computing device specially programmed to perform the functions described herein.

FIG. 6 depicts a high-level block diagram of a computing system 600 (e.g., a computing device or processing system) specifically programmed to perform the functions described herein. For example, any one or more components, devices, and/or systems illustrated in FIG. 1 or FIG. 2, or described in connection with FIGS. 2-5, may be implemented as the computing system 600. As depicted in FIG. 6, the computing system 600 comprises a hardware processor element 602 (e.g., comprising one or more hardware processors, which may include one or more microprocessor(s), one or more central processing units (CPUs), and/or the like, where the hardware processor element 602 may also represent one example of a "processing system" as referred to herein), a memory 604, (e.g., random access memory (RAM), read only memory (ROM), a disk drive, an optical drive, a magnetic drive, and/or a Universal Serial Bus (USB) drive), a module 605 for identifying risk levels for sub-areas of a region for at least one time period based upon thresholds that are associated with performance indicator data of a wireless communication network and that are generated via adaptive thresholding, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 602 is shown, the computing system 600 may employ a plurality of hardware processor elements. Furthermore, although only one computing device is shown in FIG. 6, if the method(s) as discussed above is implemented in a distributed or parallel manner for a particular illustrative example, e.g., the steps of the above method(s) or the entire method(s) are implemented across multiple or parallel computing devices, then the computing system 600 of FIG. 6 may represent each of those multiple or parallel computing devices. Furthermore, one or more hardware processor elements (e.g., hardware processor element 602) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 602 can also be configured or programmed to cause other devices to perform one or more operations as discussed above. In other words, the hardware processor element 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 605 for identifying risk levels for sub-areas of a region for at least one time period based upon thresholds that are associated with performance indicator data of a wireless communication network and that are generated via adaptive thresholding (e.g., a software program comprising computer-executable instructions) can be loaded into memory 604 and executed by hardware processor element 602 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 602) executing the computer-readable instructions relating to the above described method(s) can be perceived as a programmed processor or a specialized processor. As such, the present module 605 for identifying risk levels for sub-areas of a region for at least one time period based upon thresholds that are associated with performance indicator data of a wireless communication network and that are generated via adaptive thresholding (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
obtaining, by a processing system including at least one processor, a request that identifies a region associated with a wireless communication network;
identifying, by the processing system, a plurality of sub-areas within the region;
obtaining, by the processing system, performance indicator data of the wireless communication network for each of the plurality of sub-areas for a plurality of time periods from mobile devices within each of the plurality of sub-areas, wherein the performance indicator data is obtained in a raw format, preprocessed, and written to at least one table of a resilient distributed dataset, wherein at least a portion of the performance indicator data is obtained from the mobile devices within each of the plurality of sub-areas and loaded into an ingest database system, wherein the obtaining comprises:
establishing a data stream of a streaming data platform in accordance with the request and the plurality of sub-areas that is determined, wherein the data stream comprises:
at least one producer that publishes at least a portion of the performance indicator data to a topic that is designated for the performance indicator data, wherein the at least one producer comprises the ingest database system; and
at least one subscriber to the topic, wherein the at least one subscriber comprises a cluster computing framework implemented by the processing system for managing the resilient distributed dataset;
applying, by the processing system, an adaptive thresholding to the performance indicator data of the wireless communication network for each of the plurality of sub-areas to determine one or more thresholds associated with the performance indicator data, wherein the applying the adaptive thresholding and the identifying the plurality of sub-areas are performed in accordance with an application that is executed via the cluster computing framework;
identifying, by the processing system, a risk level, from among a plurality of risk levels, for each of the plurality of sub-areas for at least one time period of the plurality of time periods based upon the one or more thresholds and the performance indicator data of the wireless communication network for each of the plurality of sub-areas, wherein the one or more thresholds define one or more risk levels of the plurality of risk levels; and
providing, by the processing system, reporting data indicating the risk level for each of the plurality of sub-areas for the at least one time period.

2. The method of claim 1, further comprising:
presenting a map based upon the reporting data, wherein the map indicates, for each respective sub-area of the plurality of sub-areas, a visual indicator associated with the risk level of the respective sub-area for the at least one time period.

3. The method of claim 1, further comprising:
determining, for at least a portion of the plurality of sub-areas, one or more cells of the wireless communication network associated with the at least the portion of the plurality of sub-areas; and
providing additional reporting data that identifies the at least the portion of the plurality of sub-areas and the one or more cells.

4. The method of claim 3, wherein the at least the portion of the plurality of sub-areas comprises sub-areas of the plurality of sub-areas having risk levels which exceed a designated risk level of the plurality of risk levels.

5. The method of claim 3, further comprising:
presenting a map based upon the additional reporting data, wherein the map indicates the at least the portion of the plurality of sub-areas and the one or more cells.

6. The method of claim 1, wherein the one or more thresholds are determined in accordance with a specification associated with the request.

7. The method of claim 1, wherein the reporting data includes a plurality of entries, each of the plurality of entries including:
a time period of the plurality of time periods;
a sub-area of the plurality of sub-areas; and
at least one metric associated with the performance indicator data for the sub-area for the time period.

8. The method of claim 7, wherein the at least one metric comprises at least one of:
a mean of the performance indicator data for the sub-area for the time period;
a median of the performance indicator data for the sub-area for the time period;
a highest threshold of the performance indicator data for the sub-area for the time period;
a moderate threshold of the performance indicator data for the sub-area for the time period;
a lowest threshold of the performance indicator data for the sub-area for the time period; or
a number of samples of the performance indicator data for the sub-area for the time period.

9. The method of claim 1, wherein the performance indicator data comprises at least one of:
a reference signal received power;
a reference signal received quality;
a signal to noise ratio;
a signal to interference and noise ratio;
an uplink bandwidth;
a downlink bandwidth;
a session drop rate; or
a call drop rate.

10. The method of claim 1, wherein the plurality of sub-areas comprises a plurality of locations according to a grid reference system.

11. The method of claim 10, wherein a sub-area size of the plurality of sub-areas is defined at a designated precision level of the grid reference system.

12. The method of claim 11, wherein the designated precision level is selected based upon a number of available samples of the performance indicator data for each of the plurality of sub-areas for the at least one time period.

13. The method of claim 1, wherein the one or more thresholds associated with the performance indicator data are determined in accordance with a t-digest data structure for the performance indicator data.

14. The method of claim 1, wherein the reporting data is published to a second topic, wherein an analytics repository of the processing system is a subscriber to the second topic.

15. A non-transitory computer-readable medium storing instructions which, when executed by a processing system including at least one processor, cause the processing system to perform operations, the operations comprising:
obtaining a request that identifies a region associated with a wireless communication network;
identifying a plurality of sub-areas within the region;
obtaining performance indicator data of the wireless communication network for each of the plurality of sub-areas for a plurality of time periods from mobile devices within each of the plurality of sub-areas, wherein the performance indicator data is obtained in a raw format, preprocessed, and written to at least one table of a resilient distributed dataset, wherein at least a portion of the performance indicator data is obtained from the mobile devices within each of the plurality of sub-areas and loaded into an ingest database system, wherein the obtaining comprises:
establishing a data stream of a streaming data platform in accordance with the request and the plurality of sub-areas that is determined, wherein the data stream comprises:
at least one producer that publishes at least a portion of the performance indicator data to a topic that is designated for the performance indicator data, wherein the at least one producer comprises the ingest database system; and
at least one subscriber to the topic, wherein the at least one subscriber comprises a cluster computing framework implemented by the processing system for managing the resilient distributed dataset;
applying an adaptive thresholding to the performance indicator data of the wireless communication network for each of the plurality of sub-areas to determine one or more thresholds associated with the performance indicator data, wherein the applying the adaptive thresholding and the identifying the plurality of sub-areas are performed in accordance with an application that is executed via the cluster computing framework;
identifying a risk level, from among a plurality of risk levels, for each of the plurality of sub-areas for at least one time period of the plurality of time periods based upon the one or more thresholds and the performance indicator data of the wireless communication network for each of the plurality of sub-areas, wherein the one or more thresholds define one or more risk levels of the plurality of risk levels; and
providing reporting data indicating the risk level for each of the plurality of sub-areas for the at least one time period.

16. A device comprising:
a processing system including at least one processor; and
a computer-readable medium storing instructions which, when executed by the processing system, cause the processing system to perform operations, the operations comprising:
obtaining a request that identifies a region associated with a wireless communication network;
identifying a plurality of sub-areas within the region;
obtaining performance indicator data of the wireless communication network for each of the plurality of sub-areas for a plurality of time periods from mobile devices within each of the plurality of sub-areas, wherein the performance indicator data is obtained in a raw format, preprocessed, and written to at least one table of a resilient distributed dataset, wherein at least a portion of the performance indicator data is obtained from the mobile devices within each of the plurality of sub-areas and loaded into an ingest database system, wherein the obtaining comprises:
establishing a data stream of a streaming data platform in accordance with the request and the plurality of sub-areas that is determined, wherein the data stream comprises:
at least one producer that publishes at least a portion of the performance indicator data to a topic that is designated for the performance indicator data, wherein the at least one producer comprises the ingest database system; and at least one subscriber to the topic, wherein the at least one subscriber comprises a cluster computing framework implemented by the processing system for managing the resilient distributed dataset;

applying an adaptive thresholding to the performance indicator data of the wireless communication network for each of the plurality of sub-areas to determine one or more thresholds associated with the performance indicator data, wherein the applying the adaptive thresholding and the identifying the plurality of sub-areas are performed in accordance with an application that is executed via the cluster computing framework;

identifying a risk level, from among a plurality of risk levels, for each of the plurality of sub-areas for at least one time period of the plurality of time periods based upon the one or more thresholds and the performance indicator data of the wireless communication network for each of the plurality of sub-areas, wherein the one or more thresholds define one or more risk levels of the plurality of risk levels; and providing reporting data indicating the risk level for each of the plurality of sub-areas for the at least one time period.

17. The device of claim 16, wherein the operations further comprise:

presenting a map based upon the reporting data, wherein the map indicates, for each respective sub-area of the plurality of sub-areas, a visual indicator associated with the risk level of the respective sub-area for the at least one time period.

18. The device of claim 16, wherein the operations further comprise:

determining, for at least a portion of the plurality of sub-areas, one or more cells of the wireless communication network associated with the at least the portion of the plurality of sub-areas; and providing additional reporting data that identifies the at least the portion of the plurality of sub-areas and the one or more cells.

19. The device of claim 18, wherein the at least the portion of the plurality of sub-areas comprises sub-areas of the plurality of sub-areas having risk levels which exceed a designated risk level of the plurality of risk levels.

20. The device of claim 18, wherein the operations further comprise:

presenting a map based upon the additional reporting data, wherein the map indicates the at least the portion of the plurality of sub-areas and the one or more cells.

* * * * *